(12) United States Patent
Dupey (10) Patent No.: US 10,565,238 B2
(45) Date of Patent: Feb. 18, 2020

(54) ADDRESS APPLICATIONS USING ADDRESS DELIVERABILITY METRICS

(71) Applicant: SAP SE, Walldorf (DE)

(72) Inventor: Ronald Dupey, Onalaska, WI (US)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 15/671,681

(22) Filed: Aug. 8, 2017

(65) Prior Publication Data

US 2019/0050424 A1 Feb. 14, 2019

(51) Int. Cl.
| G06F 17/30 | (2006.01) |
| G06F 16/29 | (2019.01) |
| G06Q 10/08 | (2012.01) |
| G06F 16/215 | (2019.01) |
| G06F 16/2457 | (2019.01) |

(52) U.S. Cl.
CPC ............ *G06F 16/29* (2019.01); *G06F 16/215* (2019.01); *G06F 16/24578* (2019.01); *G06Q 10/083* (2013.01)

(58) Field of Classification Search
None
See application file for complete search history.

(56) References Cited

U.S. PATENT DOCUMENTS

| 8,990,316 B1 * | 3/2015 | Feinstein ................ H04L 51/34 709/206 |
| 9,230,245 B1 * | 1/2016 | Wheeler ................. G06Q 50/01 |
| 2003/0018722 A1 * | 1/2003 | Almeda ............. H04L 29/1215 709/206 |
| 2005/0197966 A1 * | 9/2005 | Payne .............. G07B 17/00508 705/62 |
| 2009/0011780 A1 * | 1/2009 | Salinas .................... H04L 51/38 455/466 |
| 2009/0159509 A1 * | 6/2009 | Wojdyla .................... B07C 3/00 209/584 |
| 2009/0197966 A1 * | 8/2009 | Weber .................. A61K 31/121 514/625 |
| 2019/0005439 A1 * | 1/2019 | Nandury ................. H04L 69/40 |

* cited by examiner

*Primary Examiner* — Hung D Le
(74) *Attorney, Agent, or Firm* — Sterne, Kessler, Goldstein & Fox P.L.L.C.

(57) ABSTRACT

Disclosed herein are system, method, and computer program product embodiments for address application using address deliverability metrics. An embodiment operates by receiving an address from a client device at an address deliverability system. The address deliverability system then parses the address into a plurality entry fields represent different geographic region fields. The address deliverability system then compares the entry fields to reference address data to determine a deliverability score indicative of the deliverability of the address. The address deliverability system then utilizes the address according to instructions corresponding to the determine deliverability score.

20 Claims, 5 Drawing Sheets

ADDRESS APPLICATIONS USING ADDRESS DELIVERABILITY METRICS

BACKGROUND

As society continues to develop data manipulation techniques, immediate verification of data has become possible. In some instances, verification includes cloud-based verification of information. This cloud-based data verification occurs via the "cleansing" of supplied data. Cleansing data may include validating received data and/or supplying missing information to provide a more complete representation of the data. For example, websites sometimes cleanse address data provided by users to obtain more accurate address representations.

Even with the cleansing of addresses via data validation or supplementation, however, uncertainties may occur regarding the real-world utilization of the cleansed address. For example, postal authorities may maintain comprehensive reference address information in urban areas but may maintain a lower level of reference address accuracy in rural areas. Further, in some countries, postal authority data may not be commercially available, may be so poor that the data may not be a credible source of information, or may not exist. When used to cleanse addresses, this poor postal authority reference data may cause the cleansed address to become useless when utilized. In a delivery context, even if an address is cleansed, if the cleansed address contains errors due to poor reference data, the utilization of the cleansed address may result in a failed delivery.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears

DETAILED DESCRIPTION

Provided herein are system, apparatus, device, method and/or computer program product embodiments, and/or combinations and sub-combinations thereof, for implementing addresses using address deliverability metrics.

In an embodiment, an address deliverability system analyzes a provided address to determine deliverability metrics related to the provided address. The provided address may be in a cleansed format or a not cleansed format. The deliverability metrics may signify one or more values indicative of the confidence of successful delivery if a letter and/or package is sent to the provided address. The address deliverability system utilizes the deliverability metrics to determine a course of action regarding the provided address. For example, based on one or more thresholds, the address deliverability system may compare a calculated deliverability score based on the deliverability metrics to determine whether to utilize the provided address in a delivery context, to request a user confirmation of the provided address, reject the provided address, and/or generate an alert to a client device providing the address.

The address deliverability score may provide useful information related to the reliability of the reference address data provided by a postal authority. Using the deliverability score along with one or more thresholds also allows for customization of actions performed based on the deliverability metrics. In an embodiment, the use of an address deliverability metrics may prevent reliance on faulty, incomplete, and/or imprecise reference address data. The deliverability metrics may also prevent the utilization of fraudulently submitted addresses. The use of the deliverability metrics may prevent the sending of packages or letters to invalid addresses and/or preventing delivery delays.

In an embodiment, the address deliverability system operates to reconcile reference address data with a deliverability score. The deliverability score may indicate the precision of the reference address data. The deliverability score may also provide an added layer of analysis to address cleansing systems that cleanse addresses based on imprecise reference address data. The deliverability score as well as the deliverability metrics may be utilized by the address deliverability system to address at least the example scenarios described below. It is noted, however, that this disclosure is not limited to these scenarios.

Example Scenario 1:

For example, postal authorities in some countries maintain differing precision levels of reference address data. For example, the United States Postal Service in the United States, Canada Post in Canada, and PostNL in Netherlands offer two options. One option includes a list of delivery points in the country while the second option utilizes ranges of addresses. When an address cleansing service utilizes the first option, the address cleansing service can validate that a delivery point exists. For example, the address cleansing service can validate that an address line, such as "305 Lake Street," exists. When the address cleansing service utilizes the second option, however, the address cleansing service may validate that there is an address range of 301-399 on the odd side of the road of Lake Street, but may not be able to confirm that the exact delivery point "305 Lake Street" exists. This lack of exact confirmation results in an undesired scenario in which the address cleansing service indicates that the address "305 Lake Street" is valid and cleansed, but does not provide the user with an indication that the exact delivery point exists or an indication that the address falls within a range of valid addresses. In an embodiment, the address cleansing service returns a cleansed address without an indication related to the method of validation.

Example Scenario 2:

In another embodiment, postal authorities in some countries store lists of street names but not valid ranges of house numbers each street. When maintaining a list of streets without house numbers, the postal authorities may include an open range of 1-999 or 1-9999 to indicate that a house number is expected for addresses on this street but the valid range is not stored. Utilizing this reference address data results in an undesired scenario in which an address cleansing service may indicate that the address "9998 Lake Street" is a valid address, only because the house number falls within the open range. In reality, however, the physical street may stop after the block of 300 house numbers.

Example Scenario 3:

In some cases, the postal authorities may store exact delivery point information for large volume receiver addresses, such as high rise complexes, universities, schools, government buildings, and/or large businesses. In other cases, however, the postal authorities may store such an incomplete list of addresses that an address cleansing service may not be able to validate more than the fact that a city exists and that the postcode is a valid postcode within the city. In these cases, a user may not be able to determine whether a delivery address even exists in the city.

Example Scenario 4:

In some cases, postal authorities in some countries maintain reference address data that indicates addresses that are unsuitable for package delivery. For example, some addresses may represent physical locations that do not receive package deliveries, such as, for example, cemeteries, parking ramps, or vacant buildings. In an embodiment, these unsuitable addresses may refer to portions of a street that formerly included valid delivery addresses, but buildings at these addresses have since been demolished and no longer exist. In these scenarios, the addresses may be valid because the addresses physically exist, but with regard to deliverability, letters and/or packages may be undeliverable to these locations. An attempt to utilize an unsuitable address may indicate the occurrence of fraudulent activity that may be useful to identify for a system administrator.

Example Scenario 5:

In some cases, countries provide varying depths of coverage related to reference address data. This difference in precision limits the validation capabilities of address cleansing services because the address cleansing services are limited to verification to the depth of the available reference address data. Users are unable to accurately measure the deliverability of an address. The address cleansing services may identify invalid or ambiguous address components or entry fields but are limited to the depth of the available reference address data.

In addressing at least these as well as other scenarios, in an embodiment, an address deliverability system may analyze provided addresses to determine deliverability metrics and/or a deliverability score. These address deliverability metrics and the deliverability score may indicate whether an exact delivery point exists or an indication that the address falls within a range of valid addresses, whether an open range of addresses was utilized, the degree of possible validation, whether an undeliverable address is detected, and/or the precision limits of reference address data. In an embodiment, the address deliverability system utilizes the address deliverability score to select a task based on a threshold for the deliverability score.

In an embodiment, the deliverability score represents a singular value. The singular value may represent a summarization of the various deliverability metrics identified based on an analysis of the address. In an embodiment, the deliverability score may include multiple values indicative of the various deliverability metrics. An example embodiment describing the utilization of a deliverability score is described with reference to FIG. 3A. An example embodiment describing the determination of a deliverability score is described with reference to FIG. 3B.

These features will now be discussed with respect to the corresponding figures.

Figure 1:
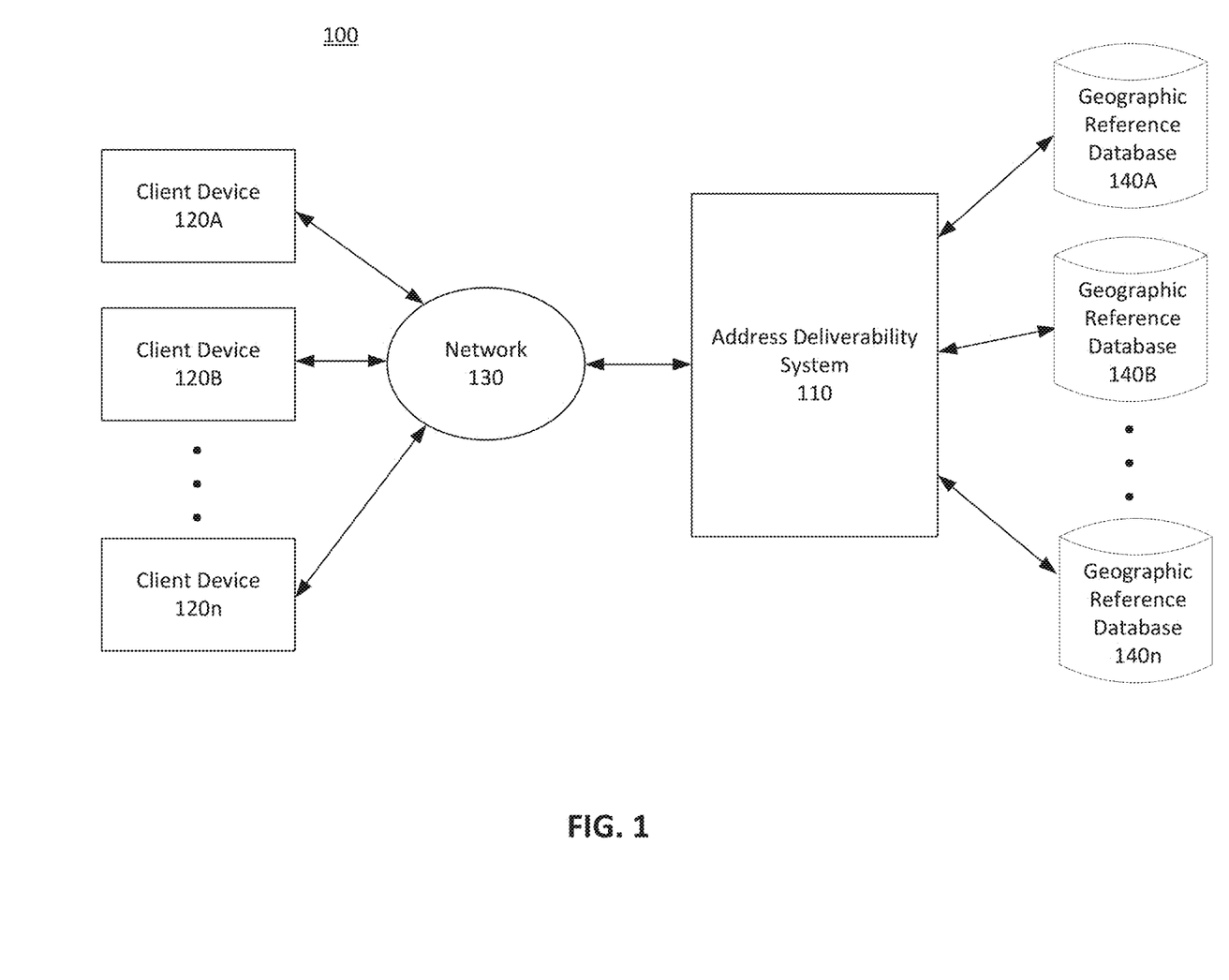
FIG. 1 is a block diagram of an address deliverability environment, according to some embodiments.

FIG. 1 is a block diagram of an address deliverability environment 100, according to some embodiments. Address deliverability environment 100 may represent an environment within which address deliverability system 110 operates to cleanse addresses and/or determine whether to utilize provided addresses and/or how to utilize provided addresses based on calculated deliverability metrics.

Address deliverability system 110 may include one or more processors, memory devices, buffers, databases, servers, routers, modems, antennae, and/or circuitry configured to interface with client devices 120, network 130, and/or geographic reference databases 140.

Client device 120 may be a computing platform, such as but not limited to smartphones, tablet computers, laptop computers, desktop computers, web browsers, and/or other computing devices, apparatuses, systems, or platforms. In an embodiment, client devices 120 are configured to supply addresses to address deliverability system 110 via network 130.

Network 130 may be a network capable of transmitting information either in a wired or wireless manner and may be, for example, the Internet, a Local Area Network, or a Wide Area Network. Network 130 may utilize a network protocol, such as, for example, a hypertext transfer protocol (HTTP), a TCP/IP protocol, Ethernet, or an asynchronous transfer mode. In an embodiment, network 130 facilitates communications between client devices 120 and address deliverability system 110. Based on communications and/or addresses received from a client device 120, address deliverability system 110 may interface with a geographic reference database 140 to retrieve reference address data for validation of client address entries.

Geographic reference databases 140 may be a database and/or other memory device storing geographic reference data. The geographic reference data may include data related to addresses, such as, for example, country, region, city, locality, street, house, floor, and/or unit information. In an embodiment, geographic reference databases 140 include other identifying information, such as, for example, a resident name, business name, and/or delivery instructions. This other identifying information may be associated with a corresponding address. Address deliverability system 110 may retrieve this reference address data from a geographic reference database 140 to validate client address entries provided by a client device 120.

In an embodiment, a geographic reference database 140 may belong to a third party that differs from the owner and/or administrator of address deliverability system 110. For example, the owner and/or administrator of address deliverability system 110 may provide address deliverability metrics to client device 120 while the owners and/or administrators of a geographic reference database 140 may specialize in the aggregation of address information. For example geographic reference database 140A may include reference address data related to a first country while geographic reference database 140B may include reference address data related to a second country. In an embodiment, a geographic reference database 140 may include Global Positioning System (GPS) information and/or Global Navigation Satellite System (GNSS) information.

These geographic reference databases 140 may belong to different owners that may differ from each other as well as differ from the owner of address deliverability system 110. In an embodiment, to communicate and/or retrieve reference address data from geographic reference databases 140, address deliverability system 110 may utilize network 130.

In an embodiment, geographic reference databases 140 are commonly owned and/or interfaced with address deliverability system 110. For example, the owner and/or administrator of address deliverability system 110 also aggregates address information and stores the information in a geographic reference database 140. Although the example of FIG. 1 depicts address deliverability system 110 as a separate object from geographic reference database 140, in an embodiment, address deliverability system 110 and geographic reference database 140 may share and/or comprise the same hardware components.

To determine the deliverability of a provided address and/or determine whether or not to implement or utilize the address, address deliverability system 110 may calculate one or more deliverability and/or validation metrics, including a deliverability score, related to a provided address. In an embodiment, a client device 120 may provide the address to address deliverability system 110. In an embodiment, the client device 120 and/or a system separate from address deliverability system 110 may first cleanse the address before providing the address to address deliverability system 110. In an embodiment, address deliverability system 110 may include address cleansing functionalities and may cleanse a received address using reference address data retrieved from one or more geographic reference databases 140.

Address deliverability system 110 may execute various algorithms for determining whether a received address has a high degree or low degree of deliverability. Address deliverability system 110 compares entry fields related to a received address with the reference address data to determine whether the reference address data matches the received address. Based on the comparison of the entry fields, address deliverability system 110 may identify matched entry fields, conflicting entry fields, and/or missing entry fields. Address deliverability system 110 may generate deliverability metrics signifying the results of the one or more comparisons. Using these deliverability metrics, address deliverability system 110 may determine a deliverability score. The deliverability score may represent a summarization of the deliverability of the address and/or may represent a confidence value indicative of the confidence of deliverability. In an embodiment, address deliverability system 110 may utilize various thresholds to determine if and/or how to utilize a received address based on a calculated corresponding deliverability score.

For example, an online retailer may utilize address deliverability system 110 to determine a deliverability of an address received from a client device 120. The online retailer may utilize servers and/or databases distinct from address deliverability system 110 to implement a front-end browser communication or the online retailer may integrate address deliverability system 110 into its online retail system. The online retailer may receive an address from a client device 120 indicating a desired location that the client device 120 wishes to have a package delivered. The online retailer may then utilize address deliverability system 110 to determine whether the supplied address has a sufficient deliverability score to merit delivery to the address. The deliverability score may provide an indication of a confidence level to the online retailer and may indicate a degree of confidence as to whether a package delivered to the specified address will reach the recipient.

In an embodiment, if the deliverability score is not sufficiently high, address deliverability system 110 may generate an error and/or a warning indicating a low degree of confidence. The address deliverability system 110 may then decide to reject the received address and not to utilize the address to perform a delivery. Address deliverability system 110 may utilize the methods described with reference to FIG. 3A and FIG. 3B to perform this determination. By identifying a spectrum of confidence related to deliverability, address deliverability system 110 may determine, or may allow a user to determine, whether a provided address is sufficiently precise to perform a delivery.

Figure 2:
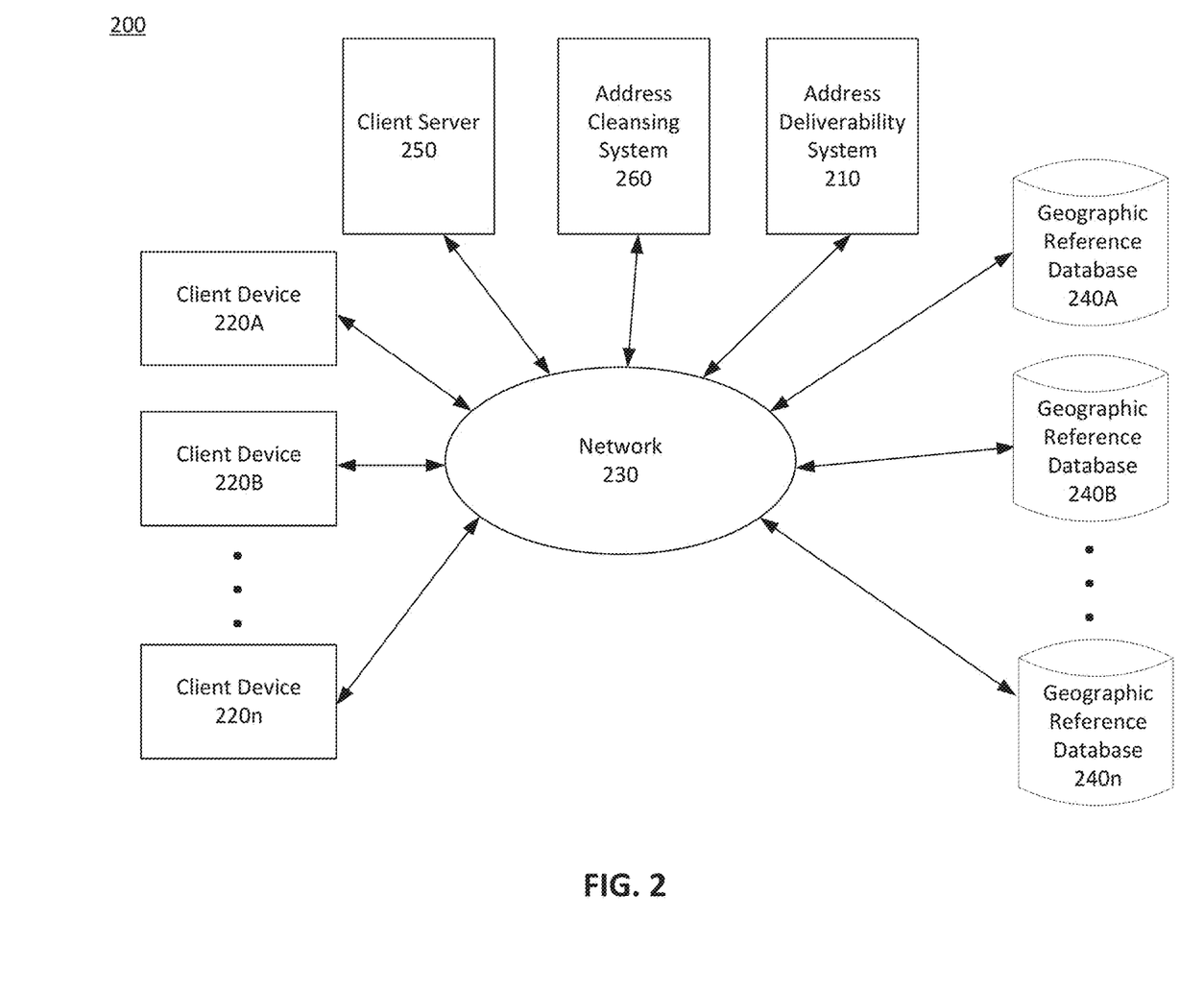
FIG. 2 is a block diagram of an address deliverability environment including a client server and an address cleansing system, according to some embodiments.

FIG. 2 is a block diagram of an address deliverability environment 200 including a client server 250 and an address cleansing system 260, according to some embodiments. The components of address deliverability environment 200 operate in a manner similar to the components associated with address deliverability environment 100. For example, address deliverability system 210 includes similar hardware and/or software to address deliverability system 110. Client devices 220 are similar to client devices 120. Network 230 is similar to network 130. Geographic reference databases 240 are similar to geographic reference database 140.

In terms of differences, the embodiments described with reference to address deliverability environment 200 include a client server 250. Client server 250 may include one or more processors, memory devices, buffers, databases, servers, routers, modems, antennae, and/or circuitry configured to interface with address deliverability system 210 client devices 220, network 230, geographic reference databases 240, and/or address cleansing system 260.

In an embodiment, client server 250 directs communications with client devices 220 and generates client address entries on behalf of the client devices 220. Client server 250 may receive addresses, address cleansing requests, and/or address deliverability score requests from client devices 220. For example, a client device may first request that the provided address be cleansed by address cleansing system 260 before determining an address deliverability score using address deliverability system 210. Client server 250 may package and/or format these non-cleansed addresses, cleansed addresses, address cleansing requests, and/or deliverability determination requests in a manner readable by address deliverability system 210 and/or address cleansing system 260. In an embodiment, this format may be a client address entry. In an embodiment, client server 250 transmits the client address entries to address cleansing system 260 for address cleansing and to address deliverability system 210 for an address deliverability analysis via network 230.

In an embodiment, client server 250 may route addresses received from client devices 220 to address cleansing system 260 and/or address deliverability system 210. Address deliverability environment 200 may be useful in situations where client devices 220 are not able to communicate with address deliverability system 210 directly. For example, client devices 220 may be configured to communicate with client server 250 but not directly communicate with address deliverability system 210 because address deliverability system 210 is a feature employed by client server 250. For example, client server 250 may be owned and/or operated by a first owner while address deliverability system 210 may be owned and/or operated by a different owner. In this case, while client server 250 may interact with both client devices 220 and address deliverability system 210, client devices 220 may not directly interact with address deliverability system 210.

For example, client server 250 may be utilized by an online retailer to facilitate online retail transaction. Part of the process of completing transactions may include receiving address information from a client device 220 to complete a shipping order. If client server 250 is configured to utilize the address cleansing capabilities of address cleansing system 260, client server 250 may transmit the address received from the client device 220 to the address cleansing system 260. If client server 250 is configured to utilize the address deliverability analysis of address deliverability system 210, client server 250 may transmit the address received from the client device 220 to the address deliverability system 210. Prior to transmitting to address deliverability system 210, client server 250 may utilize address cleansing system 260 to cleanse the address. Client server 250 may then route the cleansed address from address cleansing system 260 to address deliverability system 210

In an embodiment, client server 250 may receive an indication of deliverability from address deliverability system 210 such as a deliverability score, a deliverability determination, and/or metrics related to the deliverability of the provided address. If address deliverability system 210 returns a negative result, such as a low deliverability score and/or a recommendation not to utilize the received address, client server 250 may indicate to the client device 220 that the client device 220 has not provided sufficient address detail and/or the address provided conflicts with reference address data. In an embodiment, client server 250 may receive from the client device 220 an updated address and/or a confirmation the originally provided address is correct. Client server 250 may utilize the newly provided address and/or perform another deliverability check to determine whether the newly provided address should also be utilized.

In an embodiment, if client server 250 determines that an address should be utilized based on a determined deliverability score, for example via the method described with reference to FIG. 3A and/or FIG. 3B, client server 250 may transmit the address to address cleansing system 260 to be cleansed if the address has not already been cleansed. If the address has already been cleansed prior to being routed to address deliverability system 210, address deliverability system 210 may return a cleansed version of the address to client server 250 along with an indication and/or a recommendation to utilize the cleansed address based on a high deliverability score. Client server 250 may utilize the cleansed address to, for example, complete the shipping information and/or to complete the online retail transaction. In an embodiment, client server 250 transmits the cleansed address to client device 220 to confirm that the cleansed address is acceptable. Client device 220 may indicate whether the cleansed address is acceptable via a message sent to client server 250.

The example of FIG. 2 depicts an embodiment where client server 250 is an object separate from address deliverability system 210. In this embodiment, client server 250 communicates with address deliverability system 210 via network 230. This embodiment may be utilized when ownership of client server 250 differs from ownership of address deliverability system 210. In an embodiment, address deliverability system 210 may operate to provide cloud-based address deliverability analysis services to client server 250.

Although depicted as separate objects in FIG. 2, in an embodiment, client server 250 may share components with address deliverability system 210 and/or address cleansing system 260. For example, client server 250 may be implemented using the same hardware components and/or may share a portion of the same components. This embodiment may be utilized when ownership is common between client server 250, address deliverability system 210, and/or address cleansing system 260. In an embodiment, client server 250, address deliverability system 210, and/or address cleansing system 260 may operate together to provide cloud-based address cleansing services to client devices 220.

Figure 3A:
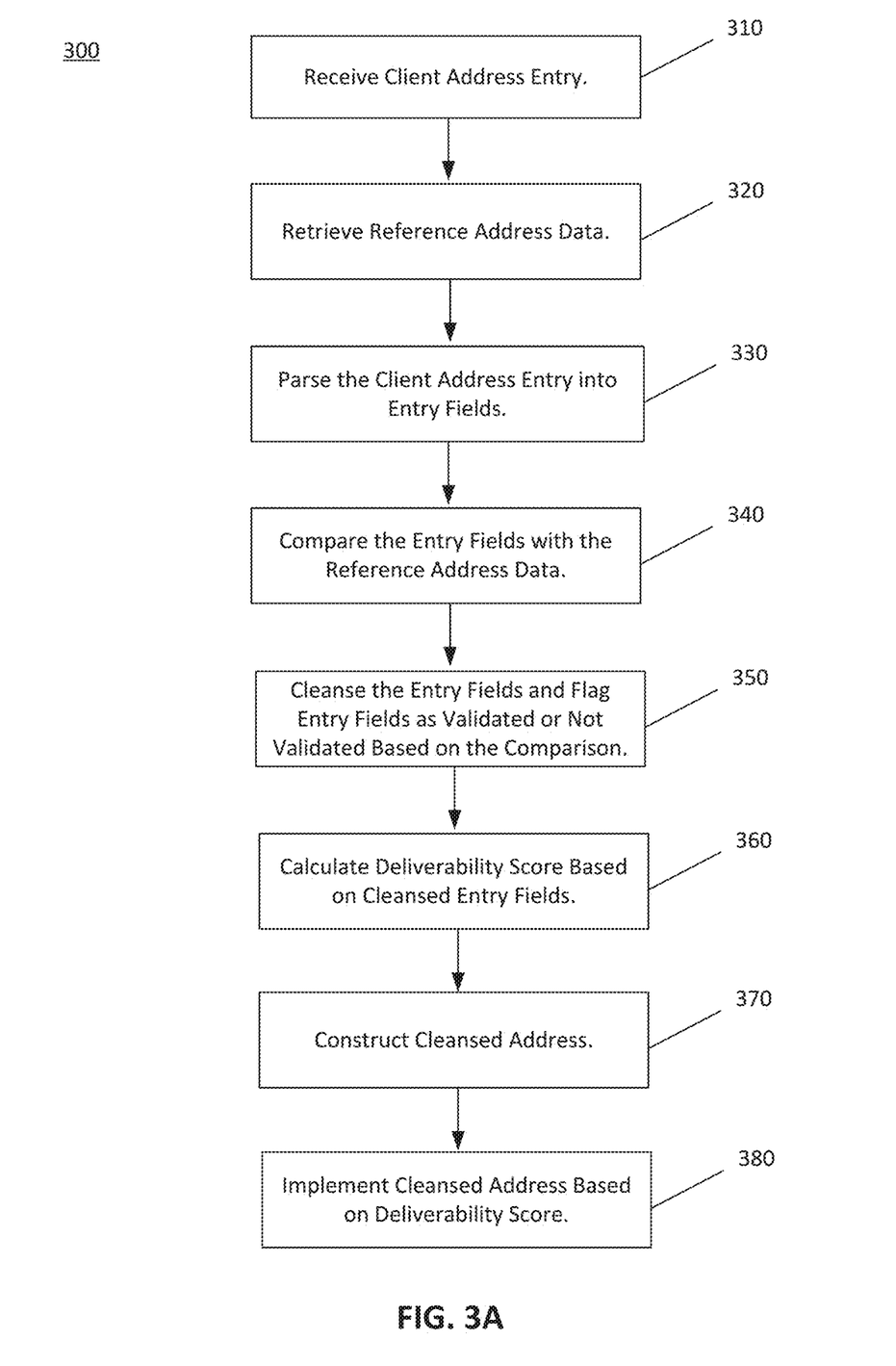
FIG. 3A is a flowchart illustrating a method for address implementation using address deliverability metrics, according to some embodiments.

FIG. 3A is a flowchart illustrating a method 300 for address implementation using address deliverability metrics, according to some embodiments. Method 300 shall be described with reference to FIG. 1. However, method 300 is not limited to that example embodiment.

Address deliverability system 110 may utilize method 300 to determine whether or not to utilize a received client address entry and/or to calculate a deliverability score. The foregoing description will describe an embodiment of the execution of method 300 with respect to address deliverability system 110. While method 300 may be described with reference to address deliverability system 110, method 300 may be executed on any computing device, such as, for example, client server 250 and/or the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3A, as will be understood by a person of ordinary skill in the art.

At 310, address deliverability system 110 may receive a client address entry from a client device 120 via network 130. The client address entry may include address information. In an embodiment, the client address entry may include a blank entry field, incomplete address information, and/or deficient address information. In an embodiment, the received client address entry may be in a cleansed format or in a format that is not cleansed. For example, client device 120 may have first cleansed the client address entry using an address cleansing system before sending the client address entry to address deliverability system 110. In an embodiment, address deliverability system 110 may receive the client address entry directly from a client device 120 without the client address entry being first cleansed. In an embodiment, address deliverability system 110 may optionally cleanse the client address entry at 350. A user utilizing client device 120 may command the client device 120 to transmit the client address entry to address deliverability system 110.

At 320, address deliverability system 110 may retrieve reference address data. In an embodiment, address deliverability system 110 retrieves the reference address data from a geographic reference database 140. In an embodiment, the reference address data may be retrieved from internal memory by one or more processors of address deliverability system 110. In an embodiment, the reference address data represents a validated data source containing sourced address information. For example, the reference address data may be locally sourced data generated from aggregated address data. Address deliverability system 110 may interface with various geographic reference databases 140 to obtain reference address data related to different countries and/or regions. The reference address data may also span various degrees of granularity regarding specific address elements, such as, for example, a house number or an apartment unit number. In an embodiment, retrieving the reference address data provides address deliverability system 110 with a data source for comparison with client address entries retrieved from client devices 120. In an embodiment, address deliverability system 110 may retrieve reference address data in response to receiving a client address entry.

In an embodiment, address deliverability system 110 may retrieve reference address data independent from a receipt of a client address entry. For example, address deliverability system 110 may preload the reference address data retrieved from geographic reference databases 140. In an embodiment, address deliverability system 110 may periodically update stored reference address data and/or may periodically query geographic reference databases 140 for updated reference address data. In an embodiment, address deliverability system 110 may periodically receive updated reference address data from geographic reference databases 140.

At 330, address deliverability system 110 parses the client address entry into a plurality of entry fields. For example, address deliverability system 110 may analyze the client address entry and parse the client address entry into country, region/state, city, postcode, various locality, street, house, floor, and/or unit information entry fields. Address deliverability system 110 may perform this parsing based on standard address formatting. This parsing then yields a plurality of distinct entry fields.

At 340, address deliverability system 110 compares the entry fields with corresponding reference address data. At 350, address deliverability system 110 cleanses the entry fields and flags entry fields as validated or not validated based on the comparison at 340. To perform the comparison at 340, address deliverability system 110 utilizes the retrieved reference address data at 320. In an embodiment, address deliverability system 110 retrieves the reference address data from one or more geographic reference databases 140. Address deliverability system 110 then compares the data of the entry fields to the reference address data to determine if one or more of the entry fields are valid.

For example, at 330, address deliverability system 110 may parse the client address entry to produce at least a city entry field, a postcode entry field, and one or more street entry fields. In an embodiment, parsing the client address entry also yields country, state, region, and/or province entry fields. In an embodiment, parsing the client address entry yields one or more of the above stated entry fields. At 340, each entry field is compared to the reference address data corresponding to the entry fields. For example, the city entry field is compared to the city reference address data. Based on the comparison at 340, the entry fields may be cleansed at 350. In an embodiment, cleansing one or more entry fields includes validating the entry fields and/or supplying missing information to provide a more complete representation of the data contained in the entry field.

In an embodiment, at 350, address deliverability system 110 generates a cleansed address. Address deliverability system 110 may utilize the reference address data to replace, correct, and/or supplement the entry fields of the client address entry. Address deliverability system 110 may replace all of the entry fields or any portion(s) of the entry fields. For example, if an entry field includes a country parameter such as "Argentina," address deliverability system 110 may recognize "Argentina" as a valid country based on a comparison of a list of countries. If the entry field, however, lists "Pangaea" as the country, address deliverability system 110 may recognize an error and determine that the entry field is not valid. In another example, address deliverability system 110 may analyze a postcode entry field. When cleansing the postcode entry field, address deliverability system 110 may supplement the postcode entry field with reference address data. For example, even if the first five digits of a ZIP code are correct, address deliverability system 110 may supplement the address with four additional digits to cleanse the received client address entry.

In another example, client address entry may include a business name which includes an office building address. Based on the business name and the reference address data, address deliverability system 110 may determine that the submitted suite number is incorrect. Address deliverability system 110 may supply the corrected suite number as the secondary address information to generate the cleansed address. In another embodiment, the client address entry may include an informal region identifier as the city data entry. Address deliverability system 110 may replace the informal region identifier with the city name. For example, the client address entry may include "Clarendon, Va." as county and state entry fields. Address deliverability system 110 may correct the entry field to instead accurately reflect the reference address data which may list the county as "Arlington County, Va."

At 350, address deliverability system 110 also flags entry fields as validated or not validated based on the comparison. In an embodiment, an entry field is validated if it matches reference address data corresponding to the entry field. In an embodiment, address deliverability system 110 also flags entry fields that are not validated. In an embodiment, an entry is not validated when the entry field does not match the reference address data and address deliverability system 110 is unable to correct and/or supplement the entry field. If address deliverability system 110 is able to correct and/or supplement the entry field (i.e., cleanse the entry field), address deliverability system 110 identifies that the entry field was cleansed.

In an embodiment, at 350, address deliverability system 110 generates metrics indicating whether an entry field matched the reference address data, whether the entry field did not match the reference address data but matched closely enough supplied data to be corrected, or if the entry field was missing a data entry, the address deliverability system 110 was able to supply the missing data entry based on other entry fields matching their respective reference address data. Address deliverability system may utilize these metrics when calculating a deliverability score at 360.

In an embodiment, address deliverability system 110 generates metrics for city, postcode, and/or street entry fields. In an embodiment, address deliverability system 110 may also recognize missing house numbers, a house number that is out of an expected range, multiple possible house numbers, a house number that matches an open range, a house number that matches a meaningful range, a house number that is not expected, extraneous house number information, a missing secondary address component (e.g., a missing unit number or floor number), an invalid secondary address component, an ambiguous secondary address component, an address-to-building mismatch, an ambiguous building or house number entry field, an invalid building or house number entry field, a missing organization field, an address-to-organization mismatch, an ambiguous street-to-postcode combination, and/or an undeliverable address as deliverability metrics.

At 360, based on the cleansing of the entry fields and generation of the deliverability metrics determine at 350, address deliverability system 110 calculates a deliverability score of the client address entry based on the cleansed entry fields. An example embodiment describing a method of calculating a deliverability score is discussed in further detail with reference to FIG. 3B (described below).

In an embodiment, the deliverability score utilizes the metrics to summarize whether an exact delivery point exists, whether the client address entry falls within a range of valid addresses, whether an open range of addresses was utilized, the degree of possible validation, whether an undeliverable address is detected, and/or the precision limits of reference address data.

In an embodiment, the deliverability score represents a singular value. The singular value may represent a summarization of the various metrics identified based on an analysis of the entry fields of the client address entry. The singular value may be, for example, a numerical value, integer value, or a character value.

In an embodiment, the deliverability score may be, for example, a single numerical value ranging from zero to ten. A higher deliverability score may represent greater confidence of deliverability based on the validation of the entry fields. A lower deliverability score may represent a lack of confidence related to deliverability. In an embodiment, the deliverability score differs from a cleanse quality score because the deliverability score may indicate a level of validation related to deliverability. A cleanse quality score, however, may indicate the number of entry fields that may have been changed and/or determine whether a provided client address entry is complete enough for cleansing. While the cleanse quality score may indicate how well a system can cleanse an address, the deliverability score provides information related to the depth of reference address data and the degree to which the reference address data validates the client address entry. In an embodiment, the deliverability score and/or the metrics may be utilized to determine whether to cleanse a client address entry. In an embodiment, address deliverability system 110 utilizes the address deliverability score to determine whether to implement and/or utilize the client address entry and/or the cleansed version of the client address entry.

At 370, address deliverability system 110 constructs a cleansed address based on the information provided in the client address entry and the result of cleansing and/or validating the entry fields at 350. In an embodiment, address deliverability system 110 may construct the cleansed address by aggregating and/or arranging the cleansed entry fields into a standard address format. These standard address formats may differ based on the country indicated from a country entry field. In an embodiment, if the address deliverability system 110 received a cleansed client address entry, address deliverability system 110 may not perform 370 when executing method 300.

At 380, address deliverability system 110 may implement the cleansed address based on the deliverability score. In an embodiment, address deliverability system 110 may compare the deliverability score with one or more thresholds stored in address deliverability system 110 to determine a course of action. The thresholds may correspond to instructions stored on memory internal to address deliverability system 110. In an embodiment, a user and/or a client device 120 may have submitted and/or set the thresholds. The thresholds may also include ranges that define a course of action when the deliverability score falls within the range.

For example, address deliverability system 110 may set a first range for deliverability scores that are 9 or 10. This first range may indicate a high deliverability score and/or high confidence in deliverability. Address deliverability system 110 may set a second range for deliverability scores that are 7 or 8. This second range may indicate a mid-level deliverability score and/or indicate potential issues with the received client address entry and/or the cleansed version of the client address entry. Address deliverability system 110 may set a third range for deliverability scores that range from 0 to 6. This third range may indicate a low level deliverability score and/or indicate major problems with the deliverability of the client address entry. Even if the client address entry is able to be cleansed, a low level deliverability score may indicate that the address is unfit to be utilized to perform deliveries of letters and/or packages. Although the above embodiment is described using specific numerical values, these ranges may be altered and/or changed to reflect desired levels of customization. Based on the thresholds and/or ranges to which a deliverability score meets, address deliverability system 110 may perform different tasks related to the client address entry or the cleansed address.

In an embodiment, if the deliverability score is above a high confidence level, address deliverability system 110 may utilize the client address entry and/or the cleansed address. Address deliverability system 110 may not perform a second check if the deliverability score is high. To utilize the client address entry and/or the cleansed address, address deliverability system 110 may perform a pre-configured action supplied by a client device 120. For example, if a client device 120 has submitted the client address entry to address deliverability system 110 for address validation for the delivery of a package, address deliverability system 110 may submit the client address entry or the cleansed address to the delivery authority to perform the delivery of the package to the client address entry or the cleansed address. In an embodiment, address deliverability system 110 may return the cleansed address and/or deliverability metrics to the client device 120 indicating that the supplied client address entry has a high deliverability score and/or a high degree of deliverability. In an embodiment, client device 120 may be a system configured to perform deliveries and/or fulfill orders, such as for example, an online retailer. In an embodiment, the deliverability score may be returned to a client server 250.

If the deliverability score is a mid-level deliverability score, address deliverability system 110 may require human interaction to review the score. For example, address deliverability system 110 may alert a system administrator to review the provided client address entry and/or the cleansed address. In an embodiment, the system administrator may confirm or reject the provided client address entry and/or the cleansed address. Utilizing a system administrator may allow utilization of the provided client address entry and/or the cleansed address without first alerting the supplying client device 120 of the need for review. From the perspective of a client device 120A, client device 120A may transmit a client address entry to the address deliverability system 110 to determine a deliverability score and to utilize the provided client address entry if the deliverability score is sufficiently high (based on a set threshold). If the deliverability score indicates a mid-level of deliverability, address deliverability system 110 may transmit the cleansed address to another client device 120B for review and/or confirmation. Based on this result, client device 120A need not be disturbed to supply a confirmation if client device 120B is able to supply confirmation. Client device 120B may be used by a system administrator that reviews cleansed addresses and/or client address entries with mid-level deliverability scores.

If the deliverability score is a low-level deliverability score, address deliverability system 110 may return the client address entry and/or cleansed address to the client device indicating a low level of deliverability. In this instance, address deliverability system 110 may generate an alert indicating that utilization of the provided client address entry may result in a failed letter and/or package delivery and/or a recommendation against utilize the provided client address entry. Address deliverability system 110 may also return the metrics determined at 350 to the client device 120. The metrics may indicate detected problems with the provided client address entry and/or problems with the reference address data used to determine the deliverability score. Although address deliverability system 110 may first return a low-level deliverability score, address deliverability system 110 may allow a client device 120 to confirm the provided client address entry and/or provide an updated client address entry to correct the potential problems. In an embodiment, client device 120 may override the recommendation provided by address deliverability system 110 and utilize the provided client address entry or cleansed address to deliver a letter or package.

Figure 3B:
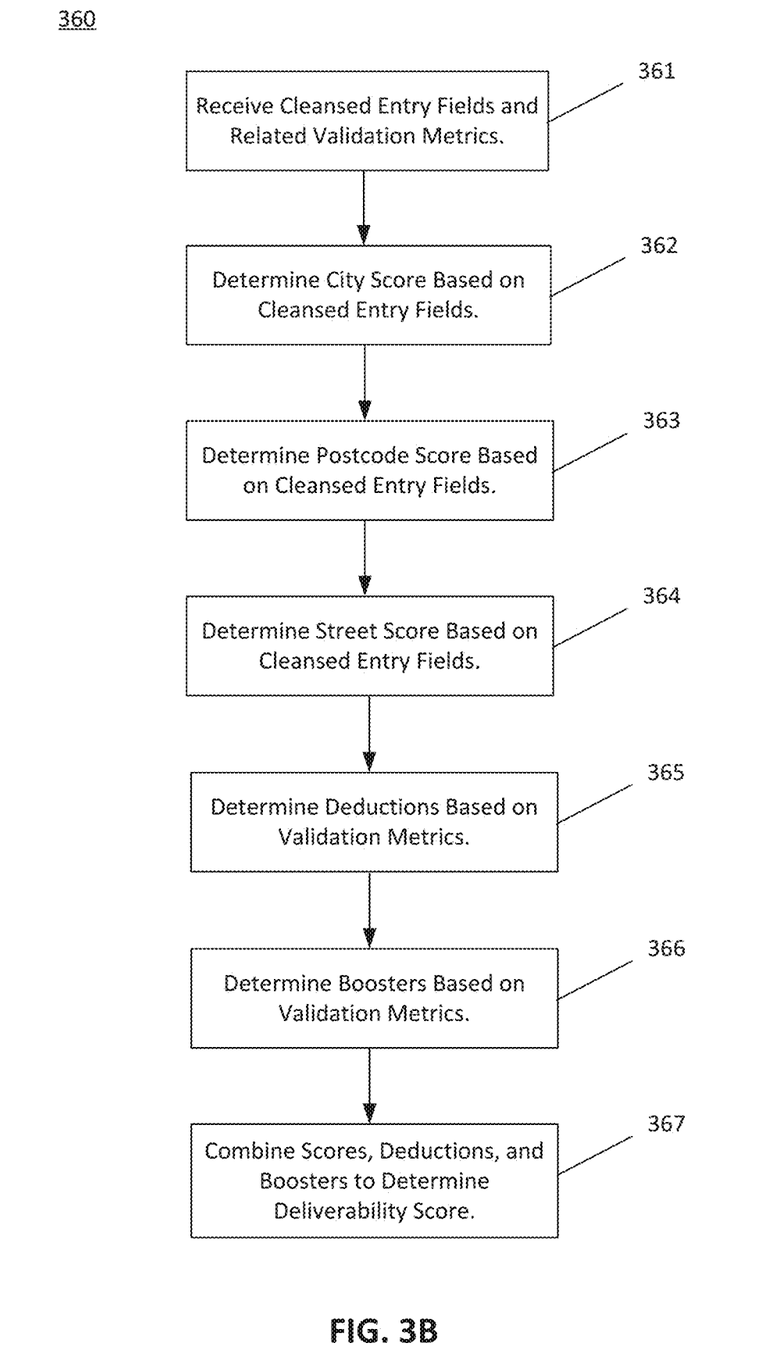
FIG. 3B is a flowchart illustrating a method for determining a deliverability score, according to some embodiments.

In some embodiments, step 360 may be implemented as shown in FIG. 3B. In particular, FIG. 3B illustrates a method for determining a deliverability score, according to some embodiments. FIG. 3B shall be described with reference to FIG. 1 and FIG. 3A. However, FIG. 3B is not limited to that example embodiment.

In some embodiments, address deliverability system 110 may utilize the method in FIG. 3B to calculate a deliverability score related to a client address entry. The foregoing description will describe an embodiment of the execution of step 360 with respect to address deliverability system 110. While step 360 may be described with reference to address deliverability system 110, step 360 (as shown in FIG. 3B) may be executed on any computing device, such as, for example, client server 250 and/or the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps in FIG. 3B may be needed to perform the disclosure provided herein. Further, some of the steps may be performed simultaneously, or in a different order than shown in FIG. 3B, as will be understood by a person of ordinary skill in the art.

In an embodiment, the method in FIG. 3B may be utilized when an address deliverability system 110 executes method 300 as described with reference to FIG. 3A. While method 300 represents a method for address implementation using address deliverability metrics, step 360 as shown in FIG. 3B may be used to determine a deliverability score based on the deliverability metrics.

At 361, address deliverability system 110 receives cleansed entry fields and related validation metrics. These cleansed entry fields are similar to the entry fields described with respect to FIG. 3A. For example, address deliverability system 110 may analyze the client address entry and parse the client address entry into country, region/state, city, postcode, various locality, street, house, floor, and/or unit information entry fields. Address deliverability system 110 may perform this parsing based on standard address formatting. This parsing then yields a plurality of distinct entry fields. The entry fields may be cleansed and/or validated. At 361, either from an external source or from within address deliverability system 110, address deliverability system 110 receives the entry fields, which may or may not be cleansed, as well as validation metrics related to the validation of each of the entry fields. The validation metrics may be the metrics generated at 350.

In an embodiment, the entry fields and metrics are grouped into two major components to generate a deliverability score: (1) city and postcode entry fields and (2) street entry fields. Address deliverability system 110 may generate scores related to each of these entry fields and combine the scores to generate a deliverability score.

At 362, address deliverability system 110 determines a city score based on the cleansed entry fields. Address deliverability system 110 compares the city entry field to reference address data to determine whether the city is valid. At 362, address deliverability system 110 may examine the metrics to determine whether the city entry field matched the reference address data, whether the entry field did not match the reference address data but matched closely enough supplied data to be corrected, or if the entry field was missing a data entry, the address deliverability system 110 was able to supply the missing data entry based on other entry fields matching their respective reference address data. Based on the metrics, address deliverability system 110 may determine a city score. In an embodiment, if the city entry field indicates that entry field matched the reference address data, was corrected, or was supplemented, address deliverability system 110 may assign a maximum number of possible points to the city score. For example, if the deliverability score ranges from 0 to 10 and the maximum possible point value for a city score is 3, address deliverability system 110 may assign 3 points to the city score if the metric associated with the city entry field indicates that the city entry field matched the reference address data, was corrected, or was supplemented. If a city entry field did not match or was unable to be corrected or supplemented, address deliverability system 110 may award zero points to the city score. In an embodiment, the status of the country, region, state, and/or locality does not factor into the determination of the city score.

In an embodiment, by awarding the full 3 points or zero points, address deliverability system 110 may be able to indicate major errors with a supplied city. If an error exists with a city, a package and/or letter may be highly unlikely to be delivered. By weighing this point value accordingly, an error with the city entry field may greater decrease confidence. Although the example embodiment describes a maximum city score as 3, the maximum city score may be altered based on customization desires of an administrator of address deliverability system 110.

At 363, address deliverability system 110 determines a postcode score based on the cleansed entry fields. Address deliverability system 110 compares the postcode entry field to reference address data to determine whether the postcode is valid. At 363, address deliverability system 110 may examine the metrics to determine whether the postcode entry field matched the reference address data, whether the entry field did not match the reference address data but matched closely enough supplied data to be corrected, or if the entry field was missing a data entry, the address deliverability system 110 was able to supply the missing data entry based on other entry fields matching their respective reference address data. Based on the metrics, address deliverability system 110 may determine a postcode score. In an embodiment, if the postcode entry field indicates that entry field matched the reference address data, was corrected, or was supplemented, address deliverability system 110 may assign a maximum number of possible points to the postcode score. For example, if the deliverability score ranges from 0 to 10 and the maximum possible point value for a postcode score is 2, address deliverability system 110 may assign 2 points to the postcode score if the metric associated with the postcode entry field indicates that the postcode entry field matched the reference address data, was corrected, or was supplemented. If a postcode entry field did not match or was unable to be corrected or supplemented, address deliverability system 110 may award zero points to the postcode score. In an embodiment, the status of the country, region, state, and/or locality does not factor into the determination of the postcode score.

In an embodiment, by awarding the full 2 points or zero points, address deliverability system 110 may be able to indicate major errors with a supplied postcode. If an error exists with a postcode, a package and/or letter may be unlikely to be delivered. By weighing this point value accordingly, an error with the postcode entry field may greater decrease confidence. Although the example embodiment describes a maximum postcode score as 2, the maximum postcode score may be altered based on customization desires of an administrator of address deliverability system 110. In an embodiment, a postcode entry field may be weighed as less important relative to the city entry field and may therefore have a maximum score that is lower than the maximum score for the city entry field.

In an embodiment, if the entry fields and metrics are grouped into two major components to generate a deliverability score, e.g., (1) city and postcode entry fields and (2) street entry fields, address deliverability system 110 may determine the first major component based on a summation of the city score and the postcode score. If the maximum city score is 3 and the maximum postcode score is 2, the maximum first major component score is 5.

Regarding the second major component related to the street entry fields, a street score may be determined based on the validation of the street information as well as potential deductions in score or boosters in score. A street score may represent street lines related to addresses but may also represent locations such as PO Boxes. Based on an analysis of the one or more street entry fields, address deliverability system 110 may be able to determine a street score. In an embodiment, if the range of possible deliverability scores ranges from 0 to 10, a street score may be a maximum of 5 points. In an embodiment, however, the relative weights of the (1) city and postcode entry fields and (2) street entry fields may be altered and/or customized depending on the desires of a system administrator.

To determine a street score at 364, address deliverability system 110 may analyze the metrics related to one or more street entry fields to determine whether the entry fields were validated, corrected, blank, incorrect, and/or invalidated. In a manner similar to determining the city score or the postcode score, address deliverability system 110 may determine whether the one or more street entry fields matched the reference address data, whether the one or more entry fields did not match the reference address data but matched closely enough supplied data to be corrected, or if the one or more entry fields were missing a data entry, the address deliverability system 110 was able to supply the missing data entry based on other entry fields matching their respective reference address data.

Based on the metrics, address deliverability system 110 may determine a street score. In an embodiment, if the metrics indicated that the one or more street entry fields matched the reference address data, were corrected, or were supplemented, address deliverability system 110 may assign a maximum number of possible points to the street score. For example, if the deliverability score ranges from 0 to 10 and the maximum possible point value for a street score is 5, address deliverability system 110 may assign 5 points to the street score if the metric associated with the street entry field indicates that the street entry field matched the reference address data, was corrected, or was supplemented. If a street entry field did not match or was unable to be corrected or supplemented, address deliverability system 110 may award zero points to the street score.

In an embodiment, to determine an initial street score, address deliverability system 110 examines the name of the street. In this embodiment, the street type (such as, for example, a "Lane" or "Boulevard") is included in a separate entry field. Similarly the house number may be represented by a separate entry field. In an embodiment, at 364, address deliverability system 110 analyzes the street name to determine whether the initial street score. For example, when determining the street score, rather than determining if "Pleasant Lane" is a valid street, address deliverability system 110 may determine if "Pleasant" is a valid name of a street in a provided city or postcode. If ambiguity exists regarding the other entry fields, address deliverability system 110 may determine that a deduction is applicable at 366.

At 365, address deliverability system 110 determines whether deductions are applicable based on the validation metrics. These deductions may further refine a street score analysis, reducing the street score if ambiguities, inconsistencies, and/or errors exist related to one or more street entry fields. A reduction in street score may represent a decrease in confidence related to an address and may result in an overall reduction of a deliverability score. Listed below are possible scenarios that may lead to a deduction in street score.

Example Deduction Scenario 1: House Number is Missing

In this scenario, a street may have a valid street name entry field but may be missing an associated house number. If, based on the reference address data, a house number is expected, address deliverability system 110 may determine that a deduction is appropriate. In an embodiment where the deliverability score ranges from 0 to 10 and the maximum possible point value for a street score is 5, this deduction may reduce the street score by 3 points.

Example Deduction Scenario 2. House Number Out of Range

In this scenario, a street may have a valid street name entry field but may have a house number entry field that is invalid. For example, based on the reference address data, a house on "Pleasant Street" may have a number ranging from 2-152 or from 160-998. If the house number entry field is 158, which does not fall within either range, address deliverability system 110 may generate an invalid range deduction. In an embodiment where the deliverability score ranges from 0 to 10 and the maximum possible point value for a street score is 5, this deduction may reduce the street score by 3 points.

Example Deduction Scenario 3: Multiple Possible House Numbers

In this scenario, a street may have a valid street name entry field but the reference address data may signify more than one similar house numbers on the street with the same postcode. For example, the reference address data may indicate that "Biberacher Street" contains house number "14" and house number "14/1". If the house number entry field signifies a house number "14," address deliverability system 110 may note the potential ambiguity of the reference address data as a deduction. Similarly, if reference address data shows that an input building number is associated with two house numbers, but neither of the two house numbers is included in the house number entry field, address deliverability system 110 may generate a deduction. In an embodiment where the deliverability score ranges from 0 to 10 and the maximum possible point value for a street score is 5, this deduction may reduce the street score by 2 points.

Example Deduction Scenario 4: House Number Matches an Open Range

In this scenario, a street may have a valid street name entry field but the reference address data may signify an open range of possible house numbers. For example, the reference address data may indicate that a house number exists if it falls within the range of 1-9999. The reference address data may include this indication potentially due to lack of complete reference data. In this case, some uncertainty may exist regarding the provided house number. Although the provided house number may fall within this range, due to the lack of specificity of the reference address data, the house number may not actually exist. Based on an analysis of the metrics, address deliverability system 110 may note this lack of precision as a deduction against the street score. In an embodiment where the deliverability score ranges from 0 to 10 and the maximum possible point value for a street score is 5, this deduction may reduce the street score by 2 points.

Example Deduction Scenario 5: House Number Matches a Closed Range

In this scenario, a street may have a valid street name entry field but the reference address data may signify a closed open range of possible house numbers. For example, the reference address data may indicate that a house number exists if it falls within the range of 21-55, 57-91, or 95-165. In this case, some uncertainty may exist regarding the provided house number but the uncertainty is less than with the open range. Although the provided house number may fall within this range, due to the lack of specificity of the reference address data, it is still possible that the house number may not actually exist. Based on an analysis of the metrics, address deliverability system 110 may note this lack of precision as a deduction against the street score. In an embodiment where the deliverability score ranges from 0 to 10 and the maximum possible point value for a street score is 5, this deduction may reduce the street score by 1 points.

Example Deduction Scenario 6: House Number Not Expected

In this scenario, a street may have a valid street name entry field but the reference address data may signify an available building name without a house number, but the house number entry field includes a data entry. For example, the reference data may note that a building name "Chalet Bellevue" exists on a particular street, but the reference data may not include a corresponding house number. The provided address, however, may include an unexpected house number relative to the reference address data. Because the building name has matched, however, address deliverability system 110 may note a minor deduction due to the inconsistency. In an embodiment where the deliverability score ranges from 0 to 10 and the maximum possible point value for a street score is 5, this deduction may reduce the street score by 1 points.

Example Deduction Scenario 7: Extraneous House Number Information

In this scenario, a street may have a valid street name entry field but the house number entry may include extraneous information. Based on a parsing of the house number, an exact delivery point match may be determined based on the reference address data, but extraneous house number information may be present. For example, a house number entry field may contain the characters "7-9". Based on cleansing and/or validation, address deliverability system 110 may determine that the house number "7" is correct while the other characters "-9" are extraneous. In an embodiment where the deliverability score ranges from 0 to 10 and the maximum possible point value for a street score is 5, this deduction may reduce the street score by 1 points.

Example Deduction Scenario 8: Secondary Component Missing

In this scenario, a street may have a valid street name entry field and valid house number, but is missing a secondary component, such as, for example, a unit number, a floor number, an apartment number, and/or a stairwell name. If, based on the reference address data, a secondary component is expected, address deliverability system 110 may determine that a deduction is appropriate. In an embodiment where the deliverability score ranges from 0 to 10 and the maximum possible point value for a street score is 5, this deduction may reduce the street score by 2 points.

Example Deduction Scenario 9: Secondary Component Invalid

In this scenario, a street may have a valid street name entry field and valid house number, but a secondary component, such as, for example, a unit number, a floor number, an apartment number, and/or a stairwell name fails to match the reference address data. For example, the reference address data may indicate that Apartment Numbers 1 and 2 are valid but the secondary component lists the apartment number as Apartment Number 3. Similarly, a building may have 22 floors but the floor number listed in the entry field lists floor number 23. If a secondary component is invalid based on the reference address data, address deliverability system 110 may determine that a deduction is appropriate. In an embodiment where the deliverability score ranges from 0 to 10 and the maximum possible point value for a street score is 5, this deduction may reduce the street score by 2 points.

Example Deduction Scenario 10: Secondary Component Ambiguous

In this scenario, a street may have a valid street name entry field and valid house number, but a secondary component, such as, for example, a unit number, a floor number, an apartment number, and/or a stairwell matches multiple possible entry fields. For example, a unit number entry field may indicate a "Unit 1" as an entry field but may not indicate a particular floor. In a particular building, however, each floor may include a "Unit 1" and without the floor number, the secondary component is ambiguous. If a secondary component is ambiguous based on multiple possibilities, address deliverability system 110 may determine that a deduction is appropriate. In an embodiment where the deliverability score ranges from 0 to 10 and the maximum possible point value for a street score is 5, this deduction may reduce the street score by 2 points.

Example Deduction Scenario 11: Address Matches, Building Does not Match

In this scenario, a street may have a valid street name entry field and house number, but may include a building name that differs from the reference address data. For example, the building name provided in the entry field may state "Edison House" when the reference address data may expect "Vodafone House" at the particular address provided. Based on this discrepancy, address deliverability system 110 may determine that a deduction is appropriate. In an embodiment where the deliverability score ranges from 0 to 10 and the maximum possible point value for a street score is 5, this deduction may reduce the street score by 3 points.

Example Deduction Scenario 12: Address Matches, Building is Ambiguous

In this scenario, a street may have a valid street name entry field and house number, but the reference address data may list more than one building name that may correspond to a provided building name entry field. For example, the building name provided in the entry field may state "2" when the reference address data may include "Block 2" and "Haus 2" as building names at the particular address provided. Based on this ambiguity over which building is correct, address deliverability system 110 may determine that a deduction is appropriate. In an embodiment where the deliverability score ranges from 0 to 10 and the maximum possible point value for a street score is 5, this deduction may reduce the street score by 3 points.

Example Deduction Scenario 13: House Number and Building Name are Invalid or Ambiguous In this scenario, a street may have a valid street name entry field, but the reference address data may include multiple building numbers and/or house numbers that could correspond to the provided information. In an embodiment, due to a lack of both the building number and house number, an address deliverability system 110 may not be able to make a match. If one of those pieces of information were present, address deliverability system 110 may be able to generate a match and supply the other. Based on this discrepancy, address deliverability system 110 may determine that a deduction is appropriate. In an embodiment where the deliverability score ranges from 0 to 10 and the maximum possible point value for a street score is 5, this deduction may reduce the street score by 4 points. This scenario may indicate an error that is more severe than lacking a single street entry field.

In an embodiment, this scenario may also be triggered when insufficient clarity exists between the building name and the street. For example, the reference address data may include both a street and a building corresponding to a given name when no numerical street value is provided. Without a house number to indicate that the given name corresponds to a street or without a building name to fix the building name, ambiguity exists and may reduce the street score by 4 points.

Example Deduction Scenario 14: Address Matches, Organization is Missing

In this scenario, a street may have a valid street name entry field, but the reference address data lists an organization name that is missing from the provided address. For example, the organization listed may refer to a business occupying the area listed at the address. Based on this lack of organization name, address deliverability system 110 may determine that a slight deduction is appropriate. In an embodiment where the deliverability score ranges from 0 to 10 and the maximum possible point value for a street score is 5, this deduction may reduce the street score by 1 points.

Example Deduction Scenario 15: Address Matches, Organization Does Not Match

In this scenario, a street may have a valid street name entry field and house number, but the organization name provided may not match the organization name listed in the reference address data. Based on this conflicting organization name, address deliverability system 110 may determine that a deduction may be appropriate due to the conflicting entry fields. In an embodiment where the deliverability score ranges from 0 to 10 and the maximum possible point value for a street score is 5, this deduction may reduce the street score by 2 points.

Example Deduction Scenario 16: Organization Matches, Delivery Address Does Not Match In this scenario, the organization name may match reference address data and the address provided may match an address of the reference address data, but the reference address data does not hold an association between the organization name and the provided address. Based on this lack of association between the organization (or even conflicting association of the address with another organization), address deliverability system 110 may determine that a deduction may be appropriate. In an embodiment where the deliverability score ranges from 0 to 10 and the maximum possible point value for a street score is 5, this deduction may reduce the street score by 3 points.

Example Deduction Scenario 17: Ambiguous Street and Postcode Combination

In this scenario, a street may have a valid street name entry field, but the provided postcode does not match the associated postcode from the reference address data. In an embodiment, the postcode provided may be similar to the postcode associated with the address based on the reference address. This difference may indicate a human error in providing the postcode. Similarly, another mistake may result in two similar options that correspond to the street name in the reference address data but may not match in postcode or unit. For example, the street name and house number provided may be "15 First Nations Way" with a postcode of 33777 and a unit number of 200. A first address entry may show a "15 First Nations Way" with a unit number of 200 corresponds to postcode 33778 while a second address entry may show a "15 First Nations Way" at postcode 33777 but without a unit number. Due to this ambiguity over the correct combination, address deliverability system 110 may determine that a deduction may be appropriate. In an embodiment where the deliverability score ranges from 0 to 10 and the maximum possible point value for a street score is 5, this deduction may reduce the street score by 2 points. In an embodiment, due to ambiguity, address deliverability system 110 may attempt to utilize the provided address. In an embodiment, address deliverability system 110 may be configured to use a hierarchy, adjusting for most important entry fields (such as a postcode) first.

Example Deduction Scenario 18: Undeliverable Address

In this scenario, the reference address data may include an indication that the provided address is explicitly undeliverable. For example, the address may correspond to a cemetery, parking ramp, or vacant building. In an embodiment where the deliverability score ranges from 0 to 10, address deliverability system 110 may set a deduction of 10 so that the deliverability score is zero.

In an embodiment, deductions may be combined if applicable based on the provided address. In an embodiment, a numerical value associated with the deduction may be adjusted and/or customized depending on a desired relative weight of each scenario. A greater deduction may indicate a greater error and/or ambiguity. In an embodiment, if address deliverability system 110 determines the street score to be zero at 365, address deliverability system 110 may not actively analyze the metrics for deductions at 365.

Returning to FIG. 3B, at 366, address deliverability system 110 may determine boosters related to the provided entry fields and/or validation metrics. These boosters may further refine a street score analysis, increasing the street score if the reference address data indicates a scenario which provides confidence. A booster may result in an overall increase in the overall deliverability score calculation. Listed below are possible scenarios that may lead to a boost in street score.

Example Booster Scenario 1: Building Matches, Delivery Address Does Not Match

In this scenario, the provided entry fields may include a building name and a street name. Address deliverability system 110 may match the building name provided to the reference address data. The reference address data, however, may not include an associated street name for the building. Based on this lack of street name in the reference address data, at 364, the street score may first be set at zero due to an inability to validate the street. Due to the building name matching, however, this amount of information may indicate a greater degree of confidence. The presence of a street name when the reference address data does not include a street name, however, still indicates an inconsistency. Thus, address deliverability system 110 may determine that a boost is appropriate but not a full boost. In an embodiment, this boost increases the street score from a stating score of zero. In an embodiment where the deliverability score ranges from 0 to 10 and the maximum possible point value for a street score is 5, this booster may increment the street score by 4 points.

Example Booster Scenario 2: Building Matches, Delivery Address Not Expected

In this scenario, the provided entry fields may include a building name but may not include a street name. Address deliverability system 110 may match the building name provided to the reference address data. The reference address data, however, may not include an associated street name for the building. Based on this lack of street name in the reference address data, at 364, the street score may first be set at zero due to an inability to validate the street. Due to the building name matching as well as the matching of a lack of street name in both the provided address as well as the reference address data, a greater degree of confidence may be indicated. Thus, address deliverability system 110 may determine that a boost is appropriate. In an embodiment, this boost increases the street score from a stating score of zero. In an embodiment where the deliverability score ranges from 0 to 10 and the maximum possible point value for a street score is 5, this booster may increment the street score by 5 points because no inconsistencies exist between the lack of street names.

Example Booster Scenario 3: Organization Matches, Delivery Address Not Expected

In this scenario, the provided entry fields may include an organization name but may not include a street name. Address deliverability system 110 may match the organization name provided to the reference address data. The reference address data, however, may not include an associated street name for the organization. Based on this lack of street name in the reference address data, at 364, the street score may first be set at zero due to an inability to validate the street. Due to the organization name matching as well as the matching of a lack of street name in both the provided address as well as the reference address data, a greater degree of confidence may be indicated. Thus, address deliverability system 110 may determine that a boost is appropriate. In an embodiment, this boost increases the street score from a stating score of zero. In an embodiment where the deliverability score ranges from 0 to 10 and the maximum possible point value for a street score is 5, this booster may increment the street score by 5 points because no inconsistencies exist between the lack of street names.

Example Booster Scenario 4: Organization Matches, Delivery Address is Ambiguous

In this scenario, the provided entry fields may include an organization name but the reference address data may include two or more associated delivery address. Address deliverability system 110 may match the organization name but may be unable to determine the appropriate delivery address associated with the organization due to a lack of provided address information. In this embodiment, if the organization has multiple locations in multiple cities or postcodes, address deliverability system 110 may remove the city scores and/or the postcode scores. Regarding the boost, however, because address deliverability system 110 matched the organization, address deliverability system 110 may provide a boost to the deliverability score. In an embodiment where the deliverability score ranges from 0 to 10 and the maximum possible point value for a street score is 5, this booster may increment the street score by 1 point.

Example Booster Scenario 5: Dependent Street Matches, Street Not Expected

In this scenario, the provided address and reference address data may identify an address corresponding to a city that utilizes a grid-style addressing system. In this scenario, address deliverability system 110 may identify two primary names, but a provided address may provide extraneous information. For example, the provided address may state "1112 Sul at Q Street and 4th Avenue." Address deliverability system 110 may match the intersection of "Q Street and 4th Avenue" but may not recognize the extraneous information. In this case, based on the recognition of the intersection, address deliverability system 110 may determine that a boost is appropriate but not a full boost. In an embodiment, this boost increases the street score from a stating score of zero. In an embodiment where the deliverability score ranges from 0 to 10 and the maximum possible point value for a street score is 5, this booster may increment the street score by 4 points.

Returning to FIG. 3B, at 367, address deliverability system 110 may combine the determined city score, postcode score, and/or street score with deductions and/or boosters to determine a deliverability score. This deliverability score may differ from a cleanse quality metric because a fully cleansed address may already have been provided to method 360. For example, Table 1 demonstrates three potential addresses that may be cleansed but include different deliverability scores. This difference may be a result of varying depths of reference address data and/or the number of entry fields that match the reference address data.

TABLE 1

| Address | Description |
| --- | --- |
| 760 Kennedy Rd<br>Toronto ON L3R 1L5<br>Canada | Deliverability score = 10 because reference address data provides direct delivery addresses and the entry fields of the address match the direct delivery address. |
| Basaltstraße 17<br>60487 Frankfurt<br>Germany | Deliverability score = 9 because range reference data is used and the address deliverability system matches the address to the range of odd house numbers 1-21. |
| Av Muñiz 493<br>C1253ABB Buenos Aires<br>Argentina | Deliverability score = 5 because reference address data for this country does not include street data. Address deliverability system is able to match the city and postcode with the reference address data but cannot match street information. |

While the three addresses above are cleansed, they have varying deliverability scores due to differing amounts of matching and/or the quality of the reference data. In an embodiment, at 367, after determining the deliverability score, address deliverability system 110 may determine whether to utilize or reject the provided address and/or how to utilize the address at 380 of method 300 based on the level of confidence of deliverability expressed via the deliverability score.

Figure 4:
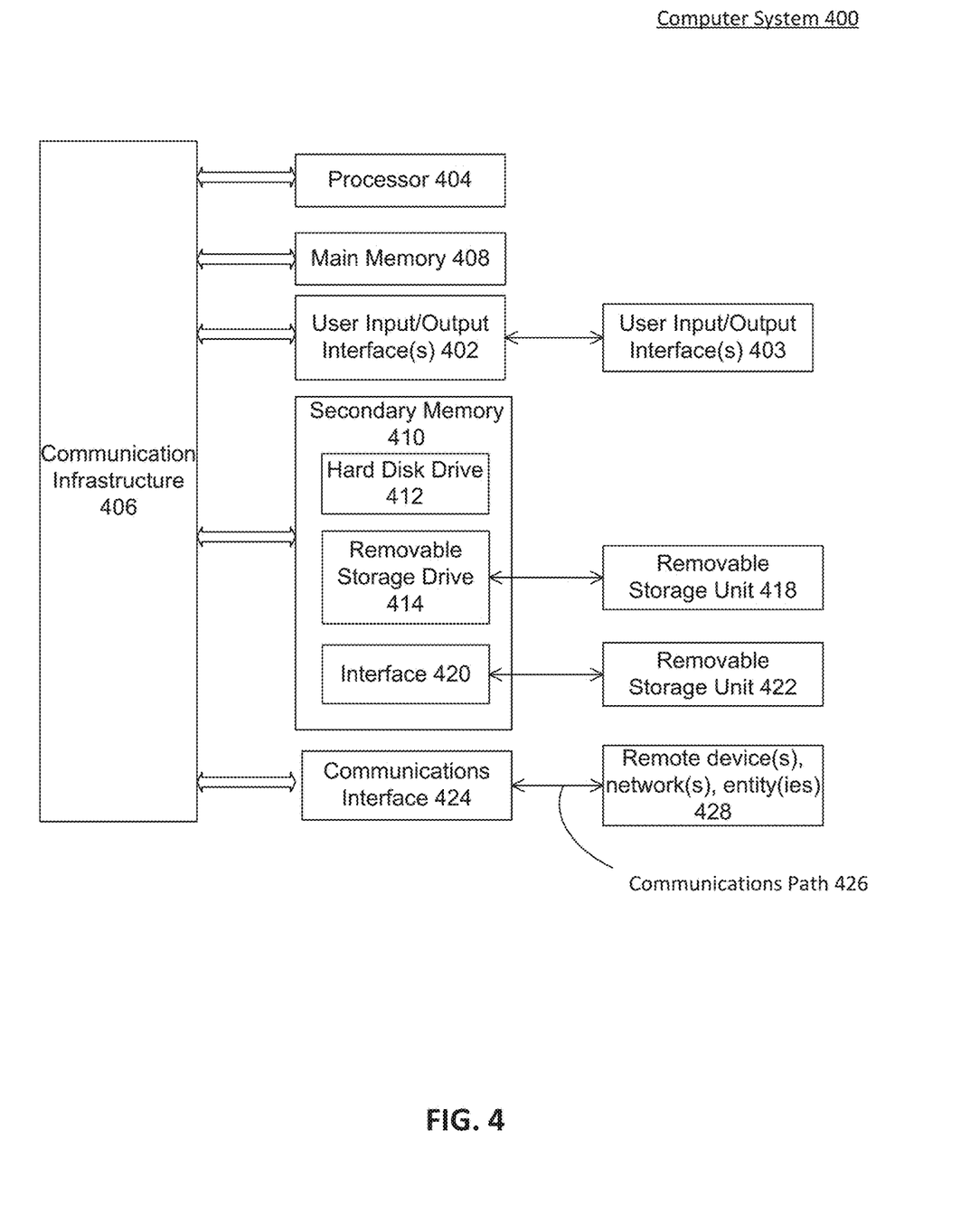
FIG. 4 is an example computer system useful for implementing various embodiments.

Referring now to FIG. 4, various embodiments of can be implemented, for example, using one or more computer systems, such as computer system 400 shown in FIG. 4. One or more computer systems 400 (or portions thereof) can be used, for example, to implement any of the embodiments shown in FIGS. 1, 2, 3A and/or 3B.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communications path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 4. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
receiving an address from a client device;
parsing the address into a plurality of entry fields representing different geographic region fields;
determining a deliverability score indicative of deliverability of the address based on a comparison of entry fields of the plurality of entry fields to reference address data by:
- determining a city score based on a comparison of a city entry field to the reference address data;
- determining a postcode score based on a comparison of a postcode entry field to the reference address data;
- determining a street score based on a comparison of one or more street entry fields to the reference address data; and
- calculating the deliverability score based on a summation of the city score, postcode score, and street score; and implementing the address according to instructions corresponding to the deliverability score.

2. The computer-implemented method of claim 1, wherein the implementing further comprises:
utilizing the address in a delivery process in response to determining that the deliverability score is above a pre-configured deliverability threshold.

3. The computer-implemented method of claim 1, wherein the determining further comprises:
determining that the reference address data includes a range of house numbers corresponding to the address; and
reducing the deliverability score in response to determining that the reference address data includes a range of house numbers corresponding to the address.

4. The computer-implemented method of claim 1, wherein the determining further comprises:
reducing the deliverability score in response to detecting extraneous entry field data not found in the reference address data.

5. The computer-implemented method of claim 1, wherein the determining further comprises:
reducing the deliverability score in response to detecting more than one entry of the reference address data corresponds to an entry field of the plurality of entry fields.

6. The computer-implemented method of claim 1, wherein the determining further comprises:
increasing the deliverability score in response to recognizing a street intersection described by the address.

7. The computer-implemented method of claim 1, wherein the calculating further comprises:
reducing the deliverability score when the address includes an invalid secondary component.

8. A system, comprising:
a memory; and
one or more processors coupled to the memory and configured to:
receive an address from a client device;
parse the address into a plurality of entry fields representing different geographic region fields;
determine a deliverability score indicative of deliverability of the address based on a comparison of entry fields of the plurality of entry fields to reference address data by:
- determine a city score based on a comparison of a city entry field to the reference address data;
- determine a postcode score based on a comparison of a postcode entry field to the reference address data;
- determine a street score based on a comparison of one or more street entry fields to the reference address data; and
- calculate the deliverability score based on a summation of the city score, postcode score, and street score; and implement the address according to instructions stored on the memory corresponding to the deliverability score.

9. The system of claim 8, wherein to implement the address, the one or more processors are further configured to:
utilize the address in a delivery process in response to determining that the deliverability score is above a pre-configured deliverability threshold.

10. The system of claim 8, wherein to determine the deliverability score, the one or more processors are further configured to:
determine that the reference address data includes a range of house numbers corresponding to the address; and
reduce the deliverability score in response to determining that the reference address data includes a range of house numbers corresponding to the address.

11. The system of claim 8, wherein to determine the deliverability score, the one or more processors are further configured to:
reduce the deliverability score in response to detecting extraneous entry field data not found in the reference address data.

12. The system of claim 8, wherein to determine the deliverability score, the one or more processors are further configured to:
reduce the deliverability score in response to detecting more than one entry of the reference address data corresponds to an entry field of the plurality of entry fields.

13. The system of claim 8, wherein to determine the deliverability score, the one or more processors are further configured to:
increase the deliverability score in response to recognizing a street intersection described by the address.

14. The system of claim 8, wherein to calculate the deliverability score, the one or more processors are further configured to:
reduce the deliverability score when the address includes an invalid secondary component.

15. A tangible computer-readable device having instructions stored thereon that, when executed by at least one computing device, causes the at least one computing device to perform operations comprising:
receiving an address from a client device;
parsing the address into a plurality of entry fields representing different geographic region fields;
determining a deliverability score indicative of deliverability of the address based on a comparison of entry fields of the plurality of entry fields to reference address data by:
- determining a city score based on a comparison of a city entry field to the reference address data;
- determining a postcode score based on a comparison of a postcode entry field to the reference address data;

determining a street score based on a comparison of one or more street entry fields to the reference address data; and calculating the deliverability score based on a summation of the city score, postcode score, and street score; and implementing the address according to instructions corresponding to the deliverability score.

16. The tangible computer-readable device of claim 15, wherein to implement the address, the operations further comprise:

utilizing the address in a delivery process in response to determining that the deliverability score is above a pre-configured deliverability threshold.

17. The tangible computer-readable device of claim 15, wherein to determine the deliverability score, the operations further comprise:

determining that the reference address data includes a range of house numbers corresponding to the address; and reducing the deliverability score in response to determining that the reference address data includes a range of house numbers corresponding to the address.

18. The tangible computer-readable device of claim 15, wherein to determine the deliverability score, the operations further comprise:

reducing the deliverability score in response to detecting extraneous entry field data not found in the reference address data; and reducing the deliverability score in response to detecting more than one entry of the reference address data corresponds to an entry field of the plurality of entry fields.

19. The tangible computer-readable device of claim 15, wherein to determine the deliverability score, the operations further comprise:

increasing the deliverability score in response to recognizing a street intersection described by the address.

20. The tangible computer-readable device of claim 15, wherein to calculate the deliverability score, the operations further comprise:

reducing the deliverability score in response when the address includes an invalid secondary component.

* * * * *